United States Patent
Fried et al.

(10) Patent No.: US 6,315,012 B1
(45) Date of Patent: Nov. 13, 2001

(54) DEVICE FOR FEEDING A FLUID INTO A CONTAINER

(75) Inventors: Michael Fried, Heidelberg; Gerhard Nestler, Ludwigshafen, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/554,074

(22) PCT Filed: Nov. 10, 1998

(86) PCT No.: PCT/EP98/07168

§ 371 Date: May 11, 2000

§ 102(e) Date: May 11, 2000

(87) PCT Pub. No.: WO99/24161

PCT Pub. Date: May 20, 1999

(30) Foreign Application Priority Data

Nov. 11, 1997 (DE) .............................. 197 49 859

(51) Int. Cl.[7] ...................................... B65B 1/04
(52) U.S. Cl. ..................... 141/311 R; 141/374; 141/346; 141/368; 141/312
(58) Field of Search ................... 141/311 R, 374, 141/347, 346, 266, 250, 312, 368

(56) References Cited

U.S. PATENT DOCUMENTS

| | | | | |
|---|---|---|---|---|
| 3,734,006 | * | 5/1973 | Hennells | 100/53 |
| 3,924,666 | * | 12/1975 | Raison | 141/231 |
| 4,544,006 | * | 10/1985 | Trenner | 141/375 |
| 5,259,423 | * | 11/1993 | Simmel et al. | 141/1 |

FOREIGN PATENT DOCUMENTS 0 064 628   11/1982   (EP) .

* cited by examiner

Primary Examiner—Steven O. Douglas
Assistant Examiner—Khoa Huynh
(74) Attorney, Agent, or Firm—Oblon, Spivak, McClelland, Maier & Neustadt, P.C.

(57) ABSTRACT

An apparatus for introducing a fluid into a container includes a supply leading into the interior of the container, closed by a bursting disk and connected to a supply line for the fluid. In order to increase the operational safety and to avoid clogging of the bursting disk, the supply is in the form of a telescopic tube which can be extended by the pressure of the fluid into the interior of the container and is mounted above the highest level in the container.

4 Claims, 4 Drawing Sheets

DEVICE FOR FEEDING A FLUID INTO A CONTAINER

BACKGROUND OF THE INVENTION

1. Field of the Invention

Apparatus for introducing a fluid into a container An apparatus for introducing a fluid into a container is used in particular for subsequent stabilization of substances which are usually stored in containers or storage tanks and which are distinguished by a strong tendency toward undesirable chemical reactions, for example premature polymerization, or other physical reactions, for example crystallization.

2. Discussion of the Background

It is known that certain substances or combinations of substances in solid or dissolved form are suitable for restabilizing the polymerizable substances which react at an undesirable time. These substances can be introduced into the stored material in a conventional manner and then mixed with the tank content by means of the pump which is usually used for tank farm facilities and which is provided for the purpose of filling and emptying tanks. The disadvantage here is that pumps themselves may be the starting point of a premature polymerization which causes blockage of the pump. Consequently, the mixing function can no longer be performed when required. A further disadvantage is the dependence on an external energy source for driving the pump, which, as a result of an emergency or by chance, may not be available, so that stabilization liquid cannot be introduced.

In order to be independent of external energy sources, a mixing process involving blowing in gases is therefore also used. A disadvantage of this is that additional baffles in or on the tank itself would have to be provided for this purpose. As a rule, such baffles must be firmly anchored to the tank in order to prevent them from being damaged or torn off during normal operation. In order to be effective, ie. to achieve good mixing, baffles for forcing in gases are usually located close to the bottom of the tank. When these baffles are not in use, the reactive substance can penetrate into the baffles and will gradually polymerize there owing to the slight exchange of material, so that, when required, the gas supply will be useless. A small air stream is therefore often passed through such lines in order to keep these lines free. However, such an air stream likewise needs to be monitored by means of apparatuses to prevent the liquid stored in the tank from rising and to keep the line open. Such designs have proven expensive for reliably performing the intended function.

EP-B 0 064 628 describes an apparatus for the emergency stoppage of polymerization reactions in a closed reaction container by the addition of inhibitor solution. The addition is effected in the lower region of the container via a connecting flange closed with a bursting disk. Mounted on this connecting flange is an angled riser line to an upper flange to which a pressurized gas line is connected. The riser line is filled with inhibitor solution which, when required, is forced into the container by the pressurized gas.

Although the operability of the apparatus should be independent of caked polymers and failure of the energy supplies, the regular monitoring usually required for safety apparatuses is more difficult in the case of these immersed baffles, and the bursting disk can be checked only when the container is empty. However, this means that the tank cannot be used during cleaning and checking.

SUMMARY OF THE INVENTION

According to the invention, the supply is in the form of a telescopic tube which can be extended by the pressure of the fluid into the interior of the container and is mounted above the highest level in the container. In the novel apparatus, where necessary the automatically activated telescopic tube dips into the material present in the container and carries liquid or gaseous substances into the material and simultaneously mixes the substances with the material. The fluid under pressure can be introduced into the container for stabilizing the substances present in the container and may be a mixture of a gas and a liquid.

Because the apparatus is installed above the highest permissible level in the container, it comes into contact with the material present in the container only when required, so that the operability is not impaired by the material present in the container.

Moreover, the apparatus can be mounted on the container or removed at any time, regardless of whether the container is in operation or not. This permits a regular function test to be carried out in a simple manner. Owing to the design of the apparatus, it can, without change of dimensions, be installed in containers with very different contents without influencing the efficiency or the operability.

Preferred embodiments are described below.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
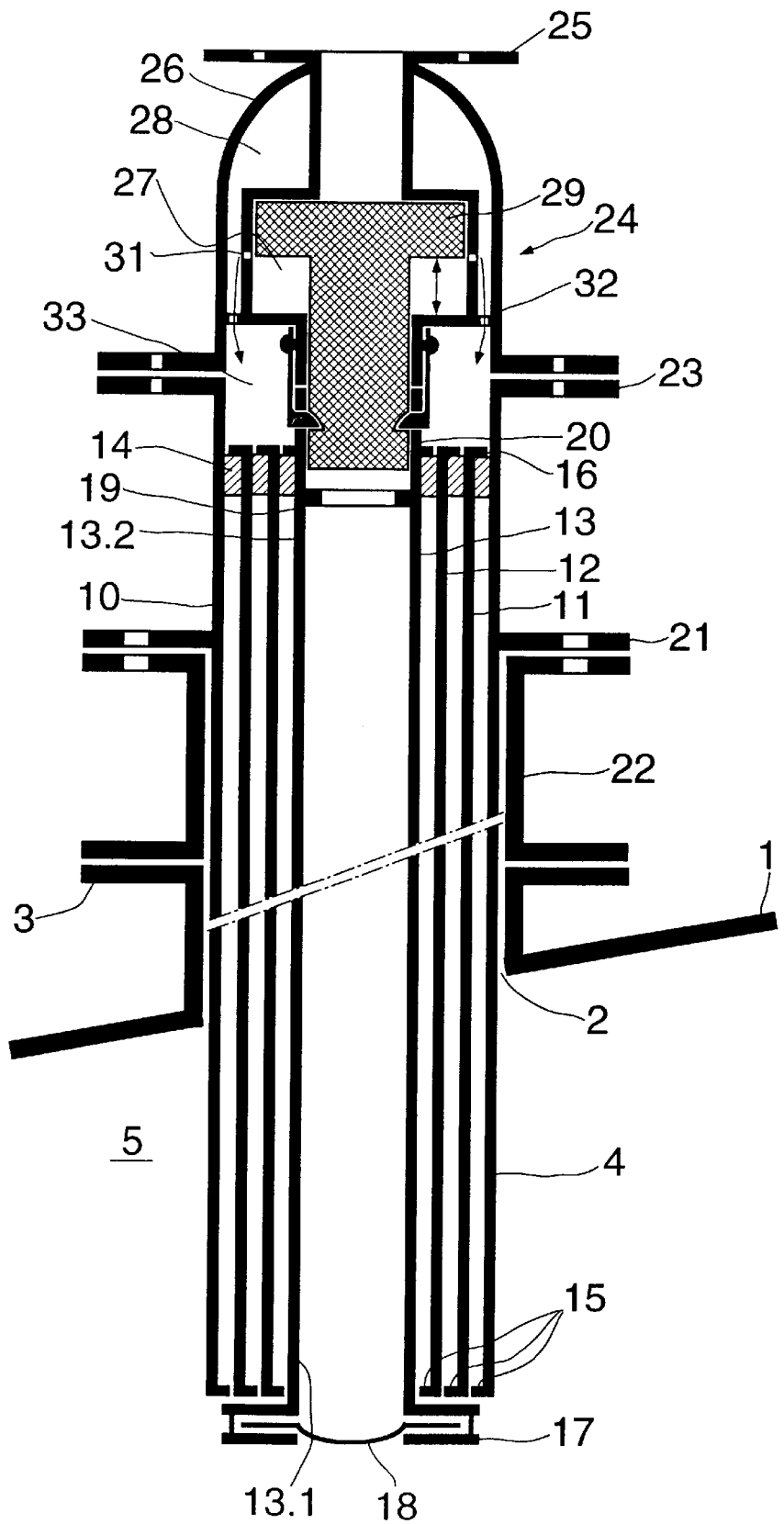
FIG. 1 shows a schematic section through an apparatus installed in a container wall and having a retracted telescopic tube.

FIG. 1 is a schematic section through a novel apparatus installed in a container wall 1. The container wall 1 has an orifice 2 with a vertical connecting flange 3. A telescopic tube 4 of the apparatus for introducing fluid into the interior 5 of the container bounded by the container wall I projects through the orifice 2.

The telescopic tube 4 consists of an outer housing tube 10 and three inner tubes 11–13, which are sealed from one another by means of seals 14. The inner tubes 11–13 have, at their ends, retaining rings 15, 16 which limit the axial movement of the inner tubes 11–13 when being pulled out.

The central inner tube 13 is provided, at its end 13.1 located in the interior 5, with a holder 17 for a bursting disk 18. In addition, the holder 17 is continued outward to such an extent that the other inner tubes 11, 12 can rest thereon. At the other end 13.2, the inner tube 13 has an inner collar 19 and an extension 20 which extends above the retaining ring 16 and whose function will be explained later.

The housing tube 10 is provided with a support flange 21 for fastening to the flange 3 of the container wall 1, it being possible to effect fastening directly or with the use of an intermediate flange 22. Furthermore, the housing tube 10 has a second flange 23 for fastening a locking apparatus 24. A supply line (not shown) for the fluid to be introduced into the interior 5 is connected to this locking apparatus via a pipeline flange 25.

The locking apparatus 24 comprises a housing 26 which encloses a piston chamber 27 connected directly to the pipeline flange 25 with regard to flow, with formation of an interior 28. Arranged in the piston chamber 27 is a piston 29 which, in the initial state, is present inside the piston chamber 27 in a position facing the pipeline flange 25.

In the region not covered by the piston 29, the piston chamber 27 has an orifice 31 providing the connection, permitting flow, with the interior 28. This orifice 31, which may be in the form of a slot, is not opened until the piston 29 reaches a lower position.

The interior 28 is connected via a further orifice 32 to a pressure chamber 33 which is bounded by the locking apparatus 24 and the inner tubes 11–13 located inside the housing tube 10 and from which the movement of the inner tubes 11–13 begins on application of fluid under pressure. The connection permitting flow is indicated by the arrows.

Figure 2:
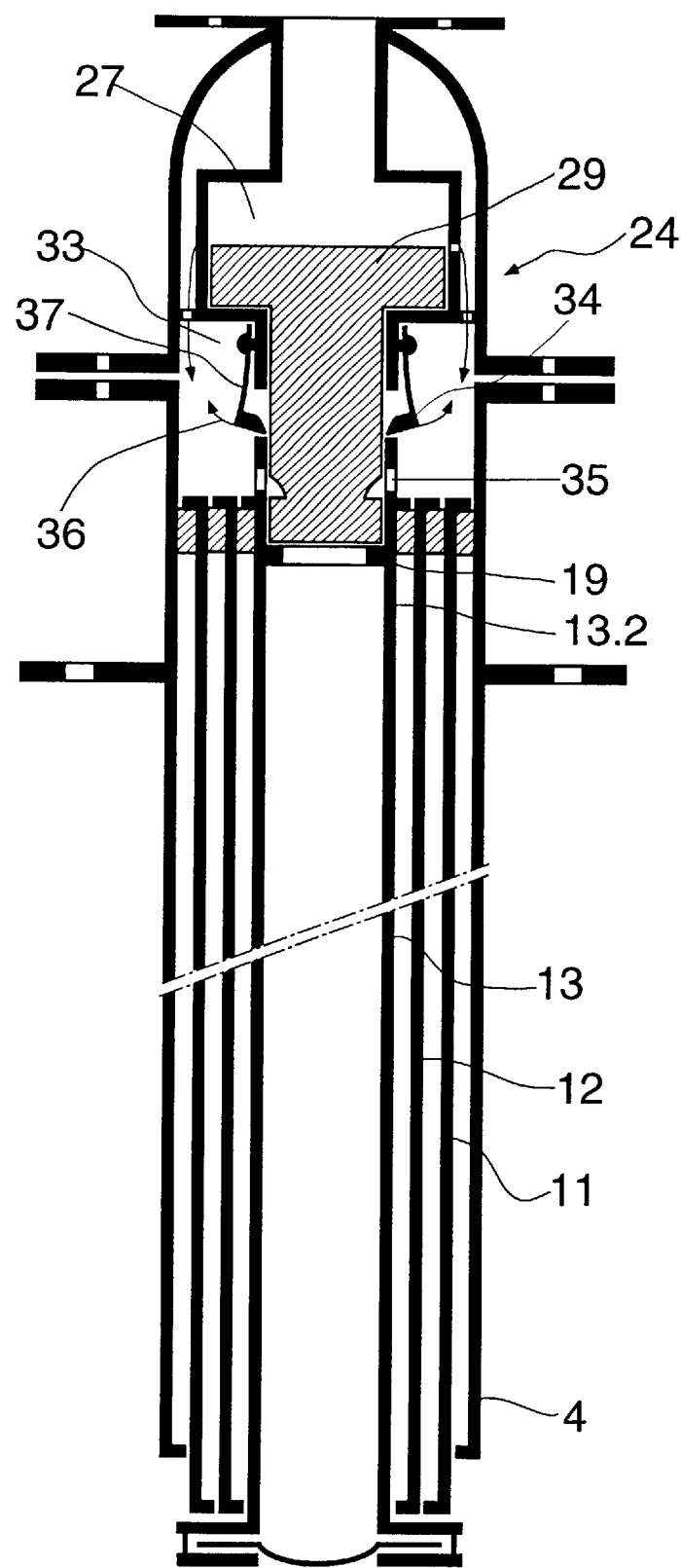
FIG. 2 shows the telescopic tube extended a distance.

Means for locking and for releasing the inner tubes 11–13 are furthermore mounted in the pressure chamber 33, said means being described in more detail in FIG. 2.

In FIG. 2, the telescopic tube 4 is shown extended a distance. For this purpose, the locking apparatus 24 was actuated so that the piston 29 is in a lower position inside the piston chamber 27. As a result of the axial displacement of the piston 29, catches 34 present in the pressure chamber 33 are released from lock openings 35 in the upper end 13.2 of the central inner tube 13. This release movement is indicated by the arrows 36.

Furthermore, during its axial displacement, the piston 29 has come to rest against the inner collar 19 and has assisted the extension movement of the inner tubes 11–13.

Figure 3:
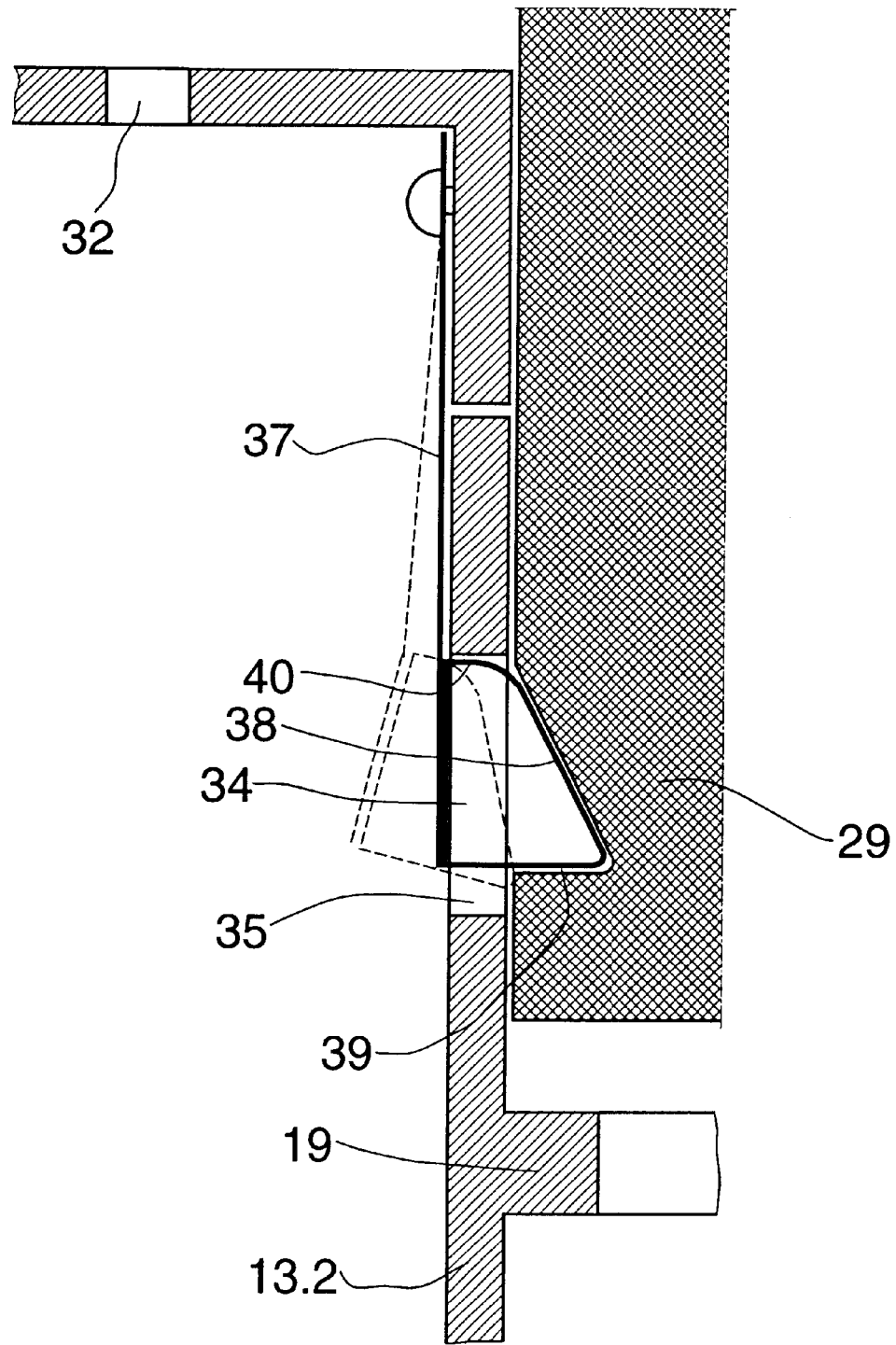
FIG. 3 shows a detail of a locking apparatus for the telescopic tube and FIG. 4 shows the apparatus with the first inner tube of the telescopic tube completely extended from the housing tube.

To permit this release, the catches 34 are mounted on spring tongues 37 and have a surface 38 which faces the piston 29, is beveled in the direction of movement and is shown on a larger scale in FIG. 3. In the locked position, the catches 34 extend through the lock openings 35 of the upper end 13.2 of the inner tube 13 and penetrate a distance into a recess 39 in the piston 29. The recess 39 has a shape corresponding to the catches, so that the catch slides on its beveled surface 38 out of the recess 39 during the axial displacement of the piston. To reduce the friction, the catch 34 may consist of PTFE (polytetrafluoroethylene). In the embodiment, the lock openings 35 are slot-like openings cut into the upper section of the central inner tube 13.

To prevent the catches 34 from unintentionally sliding out under the gravitational effect of the piston 29, the catch may be arranged on an appropriately stiff spring tongue 37 or a spring-loaded lever. The initial tension of the spring tongue 27 is chosen so that the force due to the weight of the piston 29 and acting on the beveled surface 38 is at least compensated.

Since the catch must also bear the total weight of the inner tubes 11–13, it has, in addition to the sliding region formed by the beveled surface 38, a retaining region having a straight surface 40 which interacts with a corresponding surface of the lock openings 35. As a result of the catch 34 sliding out of the recess 39 in the piston 29, the straight surface 40 is disengaged and the inner tube 13 can likewise slide past under the catch 34, along the beveled surface 38. The movement of the inner tubes 11–13 is initially supported by the piston 29, during its axial displacement, resting against the inner collar 19, and the extension movement is initiated.

Figure 4:
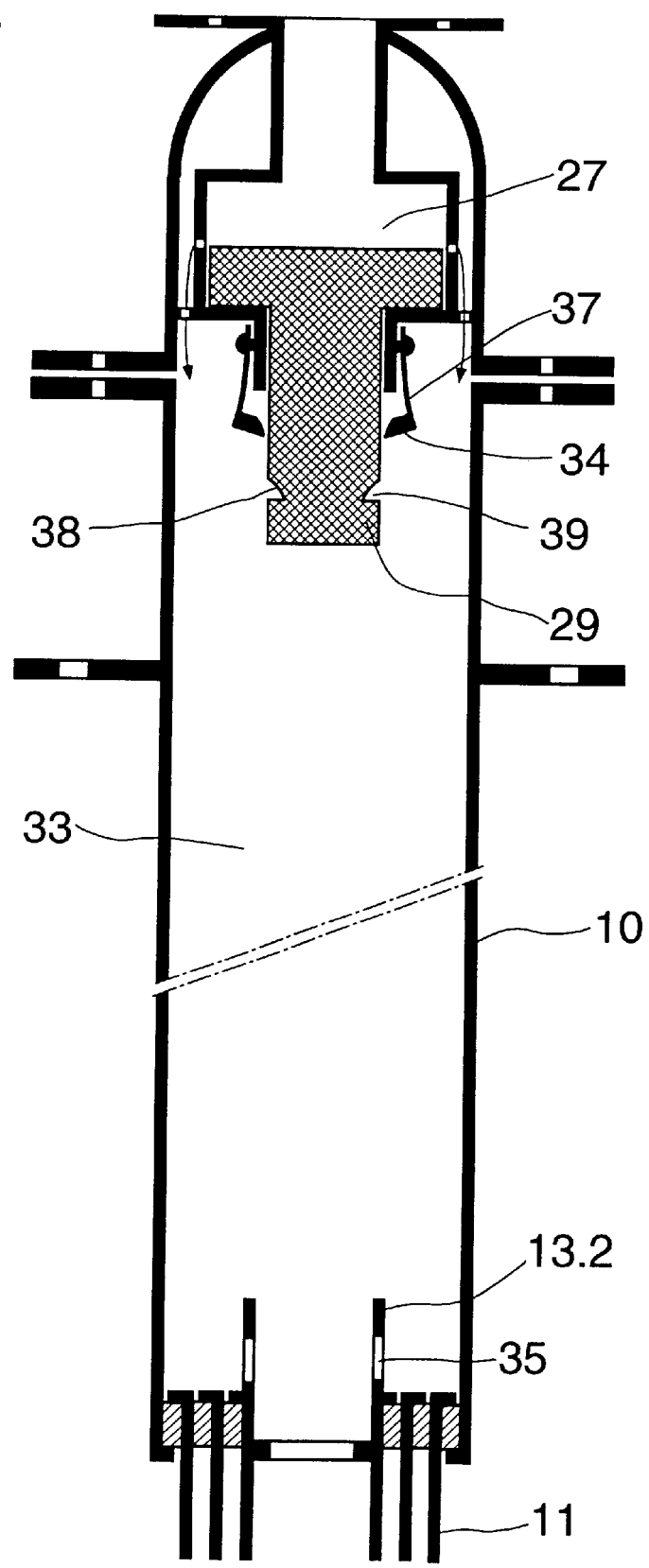

FIG. 4 shows the apparatus with the outermost inner tube 11 completely extended from the housing tube 10. The volume of the pressure chamber 33 has continuously increased as a result of being subjected to fluid under high pressure.

The locking mechanism in FIG. 4 has completely released the central inner tube 13, whose end 13.2 with the opening 35 is now at the lower end of the housing tube 10. It is clearly evident that, as a result of the displacement of the piston 29 inside the piston chamber 27 to a lower position, the catches 34 have come out of the recess 39 in the piston 29. The beveled surface 38 of the catch 34 and the corresponding surface of the recess 39 facilitate this sliding out against the spring force of the spring tongue 37.

The novel apparatus is fed with the fluid to be introduced via a supply line which is connected to the pipeline flange 25 and is not shown. A certain amount of this fluid is available under a certain pressure in a storage vessel and is not connected to the supply line until a danger arises. As a rule, the fluid to be introduced is a liquid which is present in a pressure-resistant container. This pressure-resistant container may be a conventional fire extinguisher container having a firmly connected propellant bottle. By opening the propellant bottle, the liquid is first expelled from the pressure-resistant container and introduced into the tank content through the telescopic tube 4. The excess gas subsequently flowing produces thorough mixing of the tank liquid with the injected fluid as a result of the vertical flows generated by ascending gas bubbles. It is thus sufficient if the pressure-resistant container is connected to the supply pipe by means of a fast-acting coupling immediately before the gas bottle is opened.

If the storage vessel is actuated, the pressure prevailing in the storage vessel is transmitted to the piston 29 in the piston chamber 27. As a result of the force acting on the piston 29, the piston 29 moves in the piston chamber 27, possibly against the spring force of a pressure spring.

First, the catch 34 is forced out of the recess 39 and thus the lock is released; on the other hand, the piston 29 comes to rest on the retaining ring 19 and pushes the central inner tube 13 below the catches 34, which come out of the lock openings 35.

As soon as the piston 29 has reached the lower retaining point in the piston chamber 27, gas and/or liquid flows via the horizontal orifices 31 into the lateral interior 28 and via further orifices 32 into a pressure chamber 33 above the movable inner tubes 11–13. The force of the applied pressure is now transmitted to the upper end surface of the inner tubes 11–13, the seals 14 between the inner tubes 11–13 and the housing tube 10 and the bursting disk 18 set to a certain gas pressure and located at the lower end 13.1 of the central inner tube 13 preventing an escape of pressure into the container.

The attempt by the pressurized fluid present in the pressure chamber 33 to expand gradually moves the inner tubes 11–13 downward. Owing to the larger circumference and hence the larger contact surface of all outer inner tubes 11, 12, these are initially moved downward. Since the outer and inner tubes 11, 12 rest on the holder 17, the central inner tube 13, too, is moved downward together with these. If the outermost inner tube 11 with its retaining ring 16 rests against the retaining ring 15 of the housing tube 10, the volume of the pressure chamber 33 increases as a result of the downward movement of the next inner tubes 12, 13 and forces these downward. The increase in the volume of the pressure chamber 33 ceases when all inner tubes 11–13 have reached the lower retaining point or the central inner tube 13 rests against the bottom of the container. If necessary, it is possible to provide a spacer which avoids coverage of the lower end by the container bottom and is not shown.

Since further expansion of the fluid-filled pressure chamber 33 can no longer occur, a pressure gradually builds up. When the maximum pressure required for destroying the bursting disk 18 has been reached, the fluid present in the pressure chamber 33 expands through the telescopic tubes 4 into the container interior 5.

If the fluid continuing to flow is a mixture of liquid and gas, the gas continuing to flow ensures that the liquid forced in is mixed with the container content.

The apparatus is fastened to the tank flange 3 by means of the support flange 21. For mounting at the desired distance above the maximum liquid level inside the container, intermediate flanges 22 of different heights may be used. Since the design having a square cross-section is preferred for large containers of increasing volume, the preferred range of use of the invention relates to containers having a volume of from 20 to 1000 m$^3$, corresponding to a telescope extension of from 3 to 11 meters. In conjunction with suitable containers for receiving the stabilizer liquid and suitable fast-action couplings, the apparatus permits economical, reliable and low-maintenance safety means, in particular for the storage of reactive substances.

The apparatus is particularly suitable for carrying out a process for immediately terminating free radical polymerizations by adding a phenothiazine-containing inhibitor solution to the system undergoing free radical polymerization, the solvent of the inhibitor solution comprising at least 50%, based on the weight of said solvent, of an N-alkylpyrrolidone. The N-alkylpyrrolidone may be N-methylpyrrolidone and/or N-ethylpyrrolidone.

Furthermore, it is advantageous if the phenothiazine content of the inhibitor solution is at least 10, preferably about 35–45, % by weight, based on the weight of the inhibitor solution. The apparatus can be advantageously used in particular when the system undergoing free radical polymerization comprises (meth)acrylic monomers undergoing free radical mass polymerization, it being possible for the (meth)acrylic monomer to be a (meth)acrylic acid and in particular a (meth)acrylate.

The apparatus is particularly suitable for immediately terminating free radical polymerizations, containing a phenothiazine-containing inhibitor solution, when the solvent of the inhibitor solution comprises at least 50%, based on the weight of said solvent, of an N-alkylpyrrolidone. Furthermore, the apparatus is suitable for an inhibitor solution which contains phenothiazine and an N-alkylpyrrolidone, in particular N-methylpyrrolidone.

We claim:

1. Apparatus for introducing a fluid into a container, comprising:

a bursting disk;

supply means leading into an interior portion of the container, said supply means being closable by said bursting disk and being adapted to be connected to a supply line for the fluid, wherein the supply means comprises telescopic tube means extendable by fluid pressure into the interior of the container and adapted to be mounted above a highest level in the container;

locking means for initially holding the telescopic tube means in a retracted state, the locking means comprising means for releasing the telescopic tube means, said means for releasing the telescopic tube means being actuated by the fluid pressure, the telescopic tube means comprising central inner tube means with openings formed therein wherein said means for releasing said telescopic tube means comprises catches which interact with the openings of said central inner tube means.

2. Apparatus according to claim 1, wherein the means for releasing said telescopic tube means comprises piston means guided in a piston chamber.

3. Apparatus as claimed in claim 2, wherein said piston means has recesses for partially receiving the catches, the catches being displaced from the recesses of the piston means upon displacement of the piston means.

4. Apparatus as claimed in claim 3, which further comprises spring-loaded levers wherein the catches are respectively mounted on said spring-loaded levers and each of said catches has a retaining region and a sliding region for engaging an opening of said openings of said central inner tube means.

* * * * *